United States Patent

Tatina

[11] Patent Number: 5,308,202
[45] Date of Patent: May 3, 1994

[54] ADJUSTABLE GUIDE ASSEMBLY FOR CARGO CONTAINER TRAIN WELL CARS

[75] Inventor: Richard A. Tatina, Countryside, Ill.

[73] Assignee: Portec, Inc., Shipping Systems Div., Oak Brook, Ill.

[21] Appl. No.: 804,997

[22] Filed: Dec. 11, 1991

[51] Int. Cl.⁵ ............................................. B61D 45/00
[52] U.S. Cl. ................................. 410/94; 105/355; 410/121
[58] Field of Search ................. 410/121, 94, 52, 54, 410/57, 68, 87, 88; 105/355, 374

[56] References Cited

U.S. PATENT DOCUMENTS

| | | | |
|---|---|---|---|
| 1,619,055 | 3/1927 | Blest | 105/355 |
| 4,313,702 | 2/1982 | DiMartino | 410/121 X |
| 4,754,709 | 7/1988 | Gramse et al. | 105/355 |
| 4,867,622 | 9/1989 | Brown | 410/94 X |
| 4,930,426 | 6/1990 | Saxton et al. | 105/355 |
| 5,000,633 | 3/1991 | Kowalik et al. | 105/355 X |
| 5,017,066 | 5/1991 | Tylisz et al. | 410/121 |

FOREIGN PATENT DOCUMENTS

| | | | |
|---|---|---|---|
| 2504484 | 10/1982 | France | 105/355 |
| 2172248 | 9/1986 | United Kingdom | 410/52 |

Primary Examiner—Michael S. Huppert
Assistant Examiner—James T. Eller, Jr
Attorney, Agent, or Firm—Hill, Steadman & Simpson

[57] ABSTRACT

An adjustable guide assembly for mounting on the upper edge of a longitudinal retaining wall defining a cargo container well of a well car adapted for accommodating containers of different widths in the well, has a base member and a rockable guide member. The guide member has a narrow-container stabilizer surface, a narrow-container loading assistance cam surface, and a wide-container loading assistance cam surface, which are selectively operative by swingably positioning the guide member relative to the base member.

20 Claims, 3 Drawing Sheets

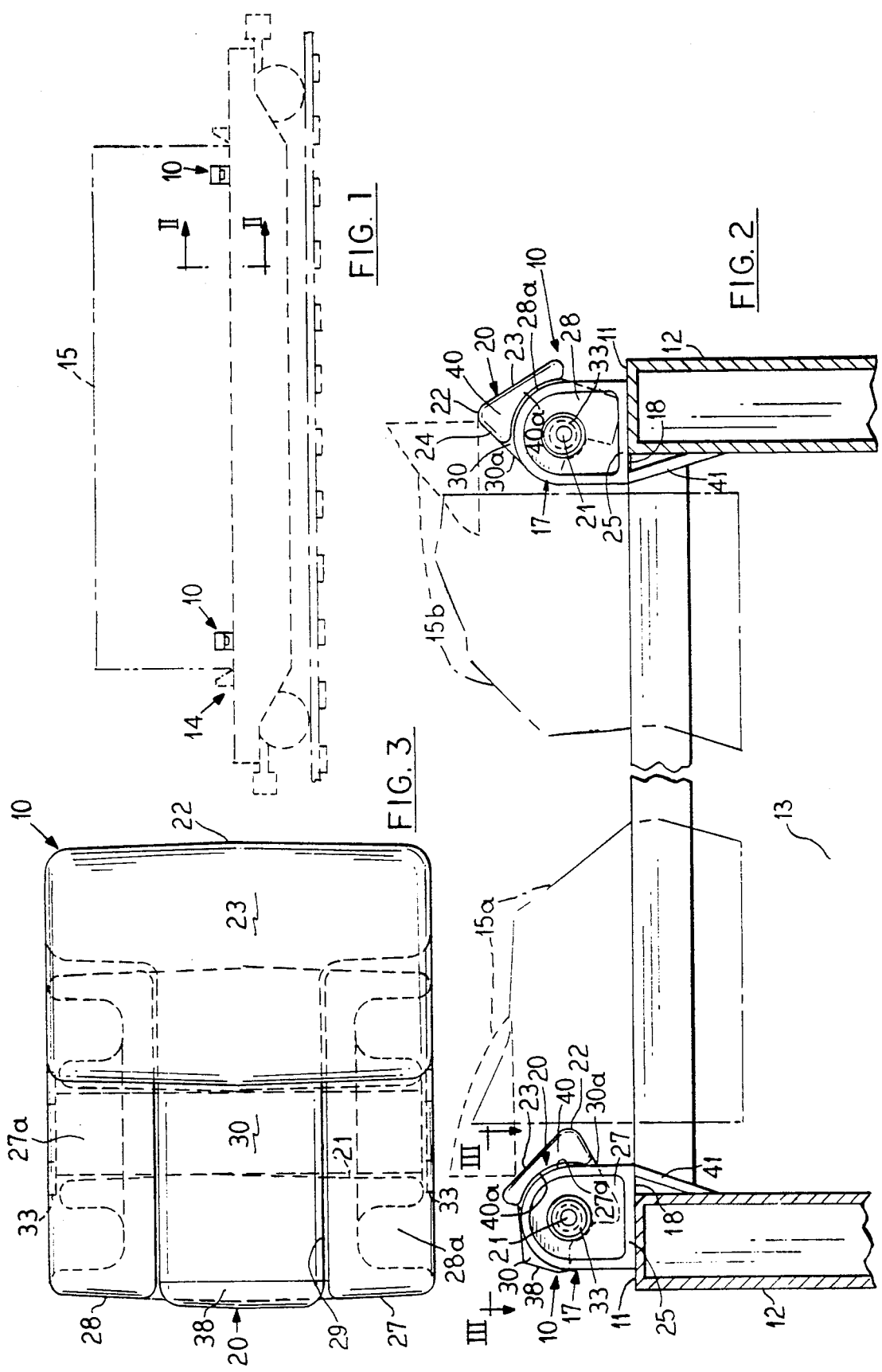

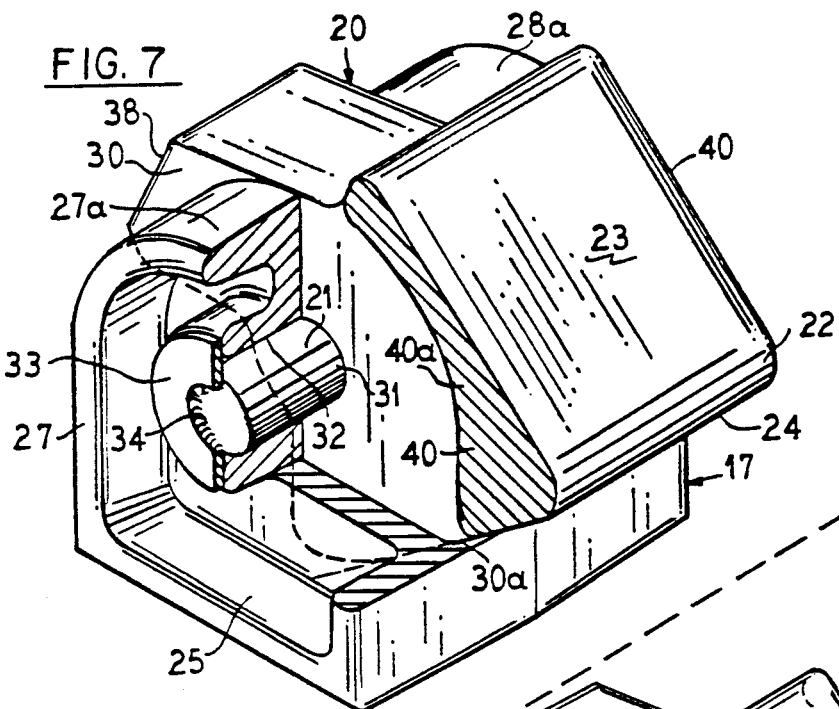
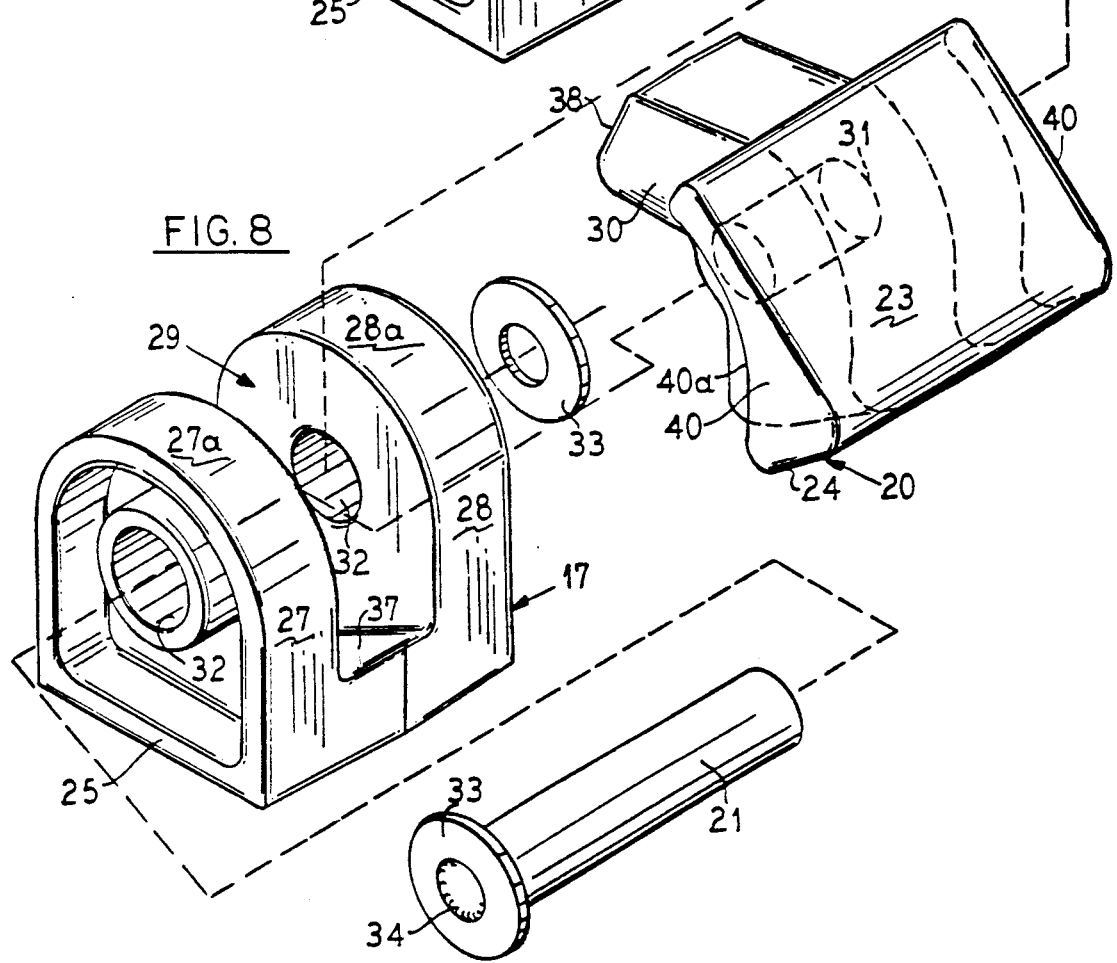

5,308,202

ADJUSTABLE GUIDE ASSEMBLY FOR CARGO CONTAINER TRAIN WELL CARS

BACKGROUND OF THE INVENTION

The present invention relates to a new and improved adjustable guide assembly for mounting on the upper edge of a longitudinal retaining wall defining a cargo container well of a well car adapted for accommodating containers of different widths in the well.

Cam surfaces associated with the upper edges of the longitudinal retaining walls of well cars are desirable for assistance in loading the cargo containers into the well. Guide means along this line have been disclosed in U.S. Pat. No. 4,754,709. However, substantial improvements are desirable.

SUMMARY OF THE PRESENT INVENTION

An important object of the present invention is to provide a new and improved cargo container guide assembly for well cars.

Another object of the invention is provide a new and improved sturdy, simplified, more economical, efficient, adjustable guide assembly for well cars.

In accordance with the principles of the present invention, there is provided a new and improved adjustable guide assembly for mounting on the upper edge of a longitudinal retaining wall defining a cargo container well of a well car adapted for accommodating alternatively narrow containers and wide containers therein, comprising: a base member having a bottom surface for attachment to said upper edge of the retaining wall, a rockable guide member, means for rockably connecting the guide-member on the base member for enabling the guide member to be swung selectively into a narrow-container position relative to said well and alternatively into a wide-container position relative to said well, a narrow-container stabilizer surface on the guide member for projection into the well when said guide member has been rocked into the narrow-container guiding position, a narrow-container loading assistance cam surface on the guide member positioned when the guide member has been rocked into in the narrow-container guiding position of the guide member for receiving and guiding a narrow container into the well, a wide-container loading assistance cam surface on the guide member positioned when the guide member has been rocked into in the wide-container guiding position of the guide member or receiving and guiding a wide container into the well, and the narrow-container stabilizer surface being in an out-of-the-way position relative to the well when the guide member is rocked into the wide-container guiding position.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a phantom, schematic side elevational view of a well car showing use of adjustable guide assemblies according to the present invention;

FIG. 2 is an enlarged fragmentary sectional elevational view taken substantially along the line II—II in FIG. 1;

FIG. 3 is a plan view taken substantially along the line III—III in FIG. 2 and showing one of the guide assemblies;

FIG. 7 is a perspective view, partially in section, of the guide assembly depicted in FIGS. 3–6; and FIG. 8 is an exploded assembly view of the guide assembly.

DETAILED DESCRIPTION

Figure 4:
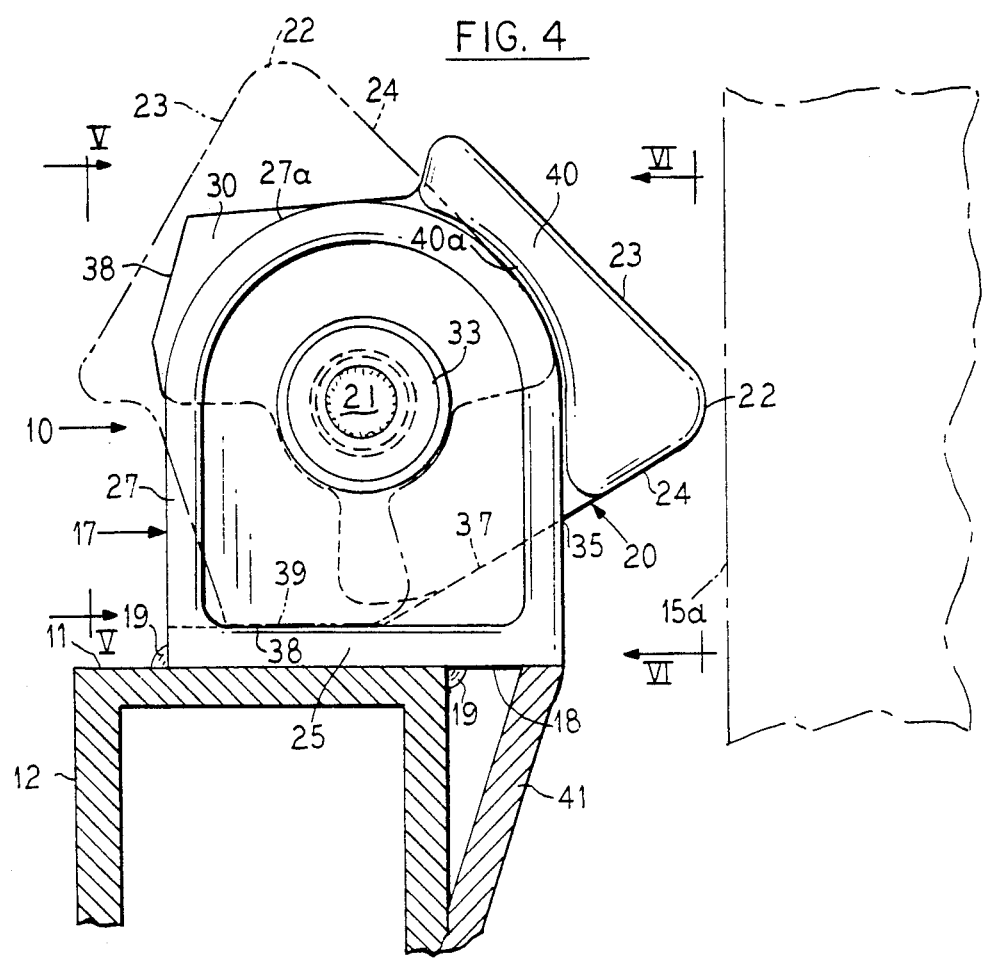
FIG. 4 is a substantially enlarged fragmentary sectional elevational view of the same guide assembly.
Figure 5:
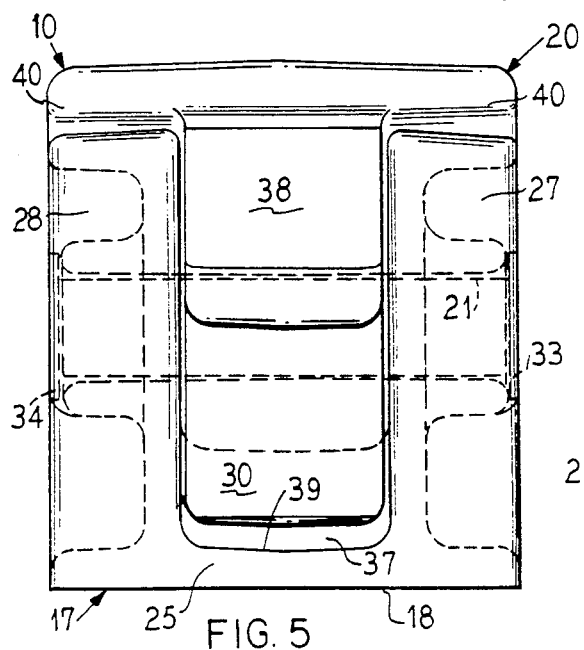
FIG. 5 is an elevational view taken substantially in the plane of line V—V in FIG. 4.
Figure 6:
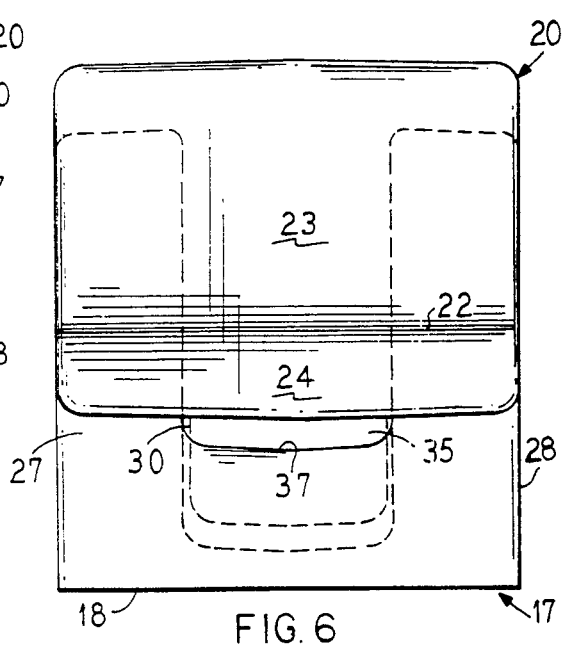
FIG. 6 is an elevational view taken substantially in the plane of line VI—VI in FIG. 4.

Referring to FIGS. 1 and 2, a respective pair of adjustable guide assemblies 10 embodying the present invention is mounted on an upper edge 11 of each of respective longitudinal, generally steel, retaining walls 12 defining a cargo container well 13 of a well car 14 adapted for accommodating cargo containers 15 of different widths in the well. In FIG. 2, a narrow width cargo container is identified in phantom at 15a, and a wider width cargo container is identified in phantom at 15b.

Each of the adjustable guide assemblies 10 is preferably identical, and comprises an economical cast metal, e.g. steel, base member 17 having a bottom surface 18 for attachment as by means of welding 19 (FIG. 4) to the upper edge 11 of the associated wall 12. A guide member 20, which may also be an economical metal casting, is rockably movably supported on the base member 17 by means of a connecting pin or axle 21, whereby the member 20 is enabled to be swung selectively into a narrow-container guiding position as shown at the left side of FIG. 2, or a wide-container guiding position as shown at the right side of FIG. 2.

A narrow-container stabilizer surface 22 on the member 20 projects into the well 13 in the narrow-container position of the member 20.

A narrow-container loading assistance cam surface 23 on the member 20 is positioned to be engaged by a narrow container when the member 20 is in its narrow container position. A wide-container loading assistance cam surface 24 on the member 20 is positioned to be engaged by a wide container when the member 20 is in its wide container position. This position of the member 20, the stabilizer surface 22 is in an out-of-the-way location relative to the well 13.

As variously shown to advantage in FIGS. 3–8, the base member 17 for each of the assemblies 10 comprises a full width base panel 25 on the bottom of which is the base surface 18. Upstanding integrally from the base panel 25 are equal, mirror image spaced guide member supporting arms 27 and 28 defining between them an upwardly opening space 29.

For supported assembly with the base member 17, the guide member 20 has a leg 30 which is rockably received in inter-digitated relation in the space 29 between the base member arms 27 and 28. A bearing bore 31 extends through the leg 30 and concentrically matches complementary aligned bearing bores 32 through the arms 27 and 28. The axle pin 21 extends through the aligned bearing bores 31 and 32 and has its opposite ends exposed at the outside ends of the bearing bores 32. For retaining the axle member 21 against shifting axially out of assembly, respective retainers 33 are provided on the opposite ends which may comprise washer-like disks secured as by means of welding 34 to the respective opposite axle ends.

Means are provided in the assembly for solidly backing up the guide member 20 on the base member 17 in its narrow-container position and in its wide-container position, that is the positions in which the guide member works selectively for guiding either a narrow- or wide-container into the well 13. To this end, when the guide member 20 is in the narrow-container guiding position as shown at the left in FIG. 2 and also as depicted in FIGS. 4–7, a thrust surface 35 on the leg 30, and comprising a continuation of the plane of the wide-container loading assistance cam surface 24, thrustingly rests against a complementary oblique solid load receiving surface 37 over-center relative to the axle 21. This bottoms the guide member 20 solidly for handling any thrust loads that may be imposed upon the container loading assistance cam surface 23 by a narrow-container 15a being lowered into the well 13 as schematically indicated in FIG. 2.

When the guide member 20 is in the wide-container position, as shown in the full line position at the right of FIG. 2 and in dot dash outline in FIG. 4, a thrust surface 38 on the leg 30 rests firmly on a load receiving surface 39 on the base plate 25, over-center relative to the axle 21 and toward the side of the base plate 25 remote from the well side of the base plate.

By virtue of the over-center support of the guide member 20 in the narrow-container and the wide-container positions, the guide member is efficiently gravitationally oriented to avoid rocking out of the selected position due to bumpings and rockings of the well car during running of the train with which it is associated.

Location of the container loading assistance cam surfaces 23 and 24 on the guide member 20 is such that in the respective operating positions of the cam surfaces, they are disposed at an efficient 45° angle slope toward the well 13.

The stabilizer surface 22 is located at the roughly triangular apex of the cam surfaces 23 and 24, and is of an efficiently rounded contour to avoid gouging the side of an associated narrow-container 15a. A convenient out-of-the-way location relative to the well 15 is assumed by the stabilizer surface 22 when the member 20 is in the wide-container guiding position.

It will be observed that for guiding efficiency the guiding cam surfaces 23 and 24 are as wide as practicable, and for this purpose spread over oppositely laterally projecting flange portions 40 of the rockable guide member 20. The under sides of the flange portions 40 are concavely shaped as identified at 40a to cooperate in closely spaced relation to convexly curve upper surfaces 27a and 28a of the arms 27 and 28.

In view of structural limitations, the wide-container cam surface 24 is shorter than the narrow-container cam surface 23, but this is compensated for by a coplanar extension surface 30a on the leg 30 which leads tangentially to the well side convex portions of the arm top surfaces 27a and 28a which thus share in the wide-container cam surface function.

Where it is desired to have the vertical edges of the arms 27 and 28 of the base member 17 serve as stabilizing or centering upper surfaces for wider containers, it may be desirable to mount the base member 17 in a predetermined overhanging relation to the well 13, substantially as depicted in FIGS. 2 and 4. In this situation, an oblique reinforcing strut 41 may be secured to extend between the overhanging portion of the base panel 25 and the well side of the wall 12 on which the assembly 10 is mounted.

Although the walls 12 and their upper edges 11 are depicted in a typical hollow wall configuration, it will be appreciated that the guide assemblies 10 are adapted to be mounted on the upper edges of different well car wall configurations of various manufacturers' preferences.

It will be apparent that various modifications and/or additions may be made in the apparatus of the invention without departing from the essential features of novelty involved, which are intended to be defined and secured by the appended claims.

I claim as my invention:

1. An adjustable guide assembly for mounting on the upper edge of a longitudinal retaining wall defining a cargo container well of a well car adapted for alternatively accommodating narrow containers and wide containers therein, and comprising:

a base member having a bottom surface for attachment to said upper edge of the retaining wall;

a rockable guide member;

means for rockably connecting said guide member on said base member for enabling the guide member to e swung selectively into a narrow-container guiding position relative to said well and alternatively into a wide-container guiding position relative to said well;

a narrow-container stabilizer surface on said guide member for projection into the well when the guide member is rocked into said narrow-container guiding position;

a narrow-container loading assistance cam surface on said guide member positioned when said guide member has been rocked into the narrow-container guiding position of said guide member for receiving and guiding a narrow container into the well;

a wide-container loading assistance cam surface on said guide member positioned when said guide member has been rocked into the wide container guiding position of said guide member for receiving and guiding a wide container into the well;

and said narrow-container stabilizer surface being in an out-of-way position relative to the well when said guide member is rocked into said wide-container guiding position.

2. An assembly according to claim 1, wherein said base member has a base panel with a portion overhanging the well side of said retaining wall, and a reinforcing strut extending between said overhanging portion of said base panel and said wall.

3. An assembly according to claim 1, wherein said base member has a base panel which has said bottom surface, a pair of upstanding arms on said base panel defining a space there between, and a leg on said guide member received in said space between said arms.

4. An assembly according to claim 3, wherein said means for rockably connecting comprises an axle pin extending through aligned bearing bores in said arms and said leg.

5. An assembly according to claim 4, wherein said axle pin has end retainer members cooperating with said arms for retaining the axle pin against endwise displacement.

6. An assembly according to claim 1, wherein said narrow-container stabilizer surface is located at the apex of a triangular formation of said guide member between said cam surfaces.

7. An assembly according to claim 6, wherein said cam surfaces are located in 45° orientation toward said well in the respective narrow-container and wide-container positions of said guide member.

8. An assembly according to claim 1, wherein said base member has upstanding spaced arms, said guide member has a leg rockably connected to said arms, and said leg and said base member having complementary load sustaining thrust surfaces which cooperate when loads are imposed on said loading assistance cam surfaces.

9. An assembly according to claim 1, wherein said base member and said guide member have inter-digitated elements with which said means for connecting interacts, and said stabilizer surface and said cam surfaces being of a width at least equal to said base member.

10. An assembly according to claim 1, wherein said base member has wide-container guide surface means cooperatively related to said wide-container cam surface in said wide-container guiding position of said guide member.

11. An adjustable guide assembly for mounting on the upper edge of a longitudinal retainer wall defining a cargo container well of a well car adapted for accommodating containers of different widths in said well, comprising:
 a base member having means for attachment to said upper edge of the retainer wall;
 a rockable guide member;
 means for rockably connecting said guide member on said base member for enabling the guide member to be rocked selectively into a narrow-container position relative to said well and a wide-container position relative to said well;
 a narrow-container loading assistance cam surface on said rockable guide member for guiding a narrow container into said well in the narrow-container guiding position of said guide member; and
 a wide-container loading assistance cam surface on said rockable guide member for guiding a wide container into said well in the wide-container position of said guide member.

12. An assembly according to claim 11, wherein said guide member includes a narrow-container stabilizer surface toward which said narrow-container guiding assistance cam surfaces merge, and said base member has a wide-container stabilizer surface toward which said wide-container loading assistance cam surface merges.

13. An assembly according to claim 11, wherein said base member has a guide surface area supplementary to said wide container loading assistance cam surface in the wise container guiding position of said guide member.

14. An assembly according to claim 11, wherein said base member and said rockable guide member have inter-digitated elements with which said means for connecting interacts, and said loading assistance cam surfaces are of a width at least equal to said base member.

15. An assembly according to claim 11, wherein said loading assistance cam surfaces converge to an apical projection there between providing a narrow-container stabilizer surface on said guide member for projecting in to said well in said narrow container position of said guide member.

16. An adjustable guide assembly for mounting on the upper edge of a longitudinal retainer wall defining a cargo container well of a well car adapted for accommodating containers of different widths in said well, comprising:
 a casting providing a base member having means for attachment to said upper edge of the retainer wall;
 a casting providing a guide member having thereon a narrow-container loading assistance cam surface and a wide-container loading assistance cam surface; and
 means connecting said members for rocking movement of said guide member for shifting said narrow container cam surface into position for assisting loading of a narrow-container into the well and for rocking movement of said guide member for shifting said wide-container loading assistance cam surface into position relative to said well for guiding a wide container into said well.

17. An assembly according to claim 16, wherein said base member has spaced upstanding arms and said guide member has a leg inter-digitated with said arms, and said connecting means connects said arms and leg pivotally.

18. An assembly according to claim 17, wherein said guide member has lateral flanges overlying said base member and having said cam surfaces thereon.

19. An assembly according to claim 16, including a narrow-container stabilizer surface for projection into said well in said narrow-container position of said guide member.

20. An assembly according to claim 18, wherein said arms have surfaces cooperatively related to curved surfaces on said flanges, and all of said surfaces have a common axis of curvature.

* * * * *